US012689806B2

(12) United States Patent
Docherty et al.

(10) Patent No.: US 12,689,806 B2
(45) Date of Patent: Jul. 21, 2026

(54) METHOD OF PROCESSING CONTENT SEARCHES

(71) Applicant: ThinkAnalytics Ltd., Glasgow (GB)

(72) Inventors: Peter Docherty, Glasgow (GB);
Christopher McGuire, Glasgow (GB);
Forbes Ingram, Glasgow (GB);
Harrison Ghatoray, Glasgow (GB)

(73) Assignee: ThinkAnalytics Ltd., Glasgow (GB)

( * ) Notice: Subject to any disclaimer, the term of this patent is extended or adjusted under 35 U.S.C. 154(b) by 82 days.

(21) Appl. No.: 18/227,584

(22) Filed: Jul. 28, 2023

(65) Prior Publication Data

US 2025/0039514 A1 Jan. 30, 2025

(51) Int. Cl.
H04N 21/482 (2011.01)
H04N 21/45 (2011.01)
H04N 21/466 (2011.01)

(52) U.S. Cl.
CPC ..... H04N 21/4826 (2013.01); H04N 21/4532 (2013.01); H04N 21/4667 (2013.01)

(58) Field of Classification Search
None
See application file for complete search history.

(56) References Cited

U.S. PATENT DOCUMENTS

| | | |
|---|---|---|
| 6,567,814 B1 | 5/2003 | Bankier et al. |
| 7,805,129 B1 | 9/2010 | Issa et al. |

| | | |
|---|---|---|
| 9,699,491 B1 | 7/2017 | Docherty et al. |
| 9,756,390 B1 | 9/2017 | Docherty et al. |
| 9,906,837 B1 | 2/2018 | Docherty et al. |
| 9,973,797 B1 | 5/2018 | Docherty et al. |
| 10,091,555 B1 | 10/2018 | Docherty et al. |
| 10,289,739 B1 | 5/2019 | Docherty et al. |
| 10,356,035 B1 | 7/2019 | Gravino et al. |
| 10,412,454 B2 | 9/2019 | Docherty et al. |
| 11,212,584 B2 | 12/2021 | Docherty et al. |
| 11,343,573 B2 | 5/2022 | Docherty et al. |
| 2003/0106064 A1 | 6/2003 | Plourde |
| 2007/0157222 A1 | 7/2007 | Cordray et al. |
| 2008/0304812 A1 | 12/2008 | Jin |

(Continued)

FOREIGN PATENT DOCUMENTS

| | | |
|---|---|---|
| EP | 1 317 143 A1 | 6/2003 |
| EP | 2 207 348 A2 | 7/2010 |

(Continued)

*Primary Examiner* — Rong Le
(74) *Attorney, Agent, or Firm* — Foley & Lardner LLP

(57) ABSTRACT

There is provided method of processing searches input into a content recommendation engine (CRE). The CRE is adapted to receive searches and provide one or more content recommendations based on the received searches for a user of a content distribution system having a plurality of users. The method comprises determining a time between consecutive searches of a plurality of searches; grouping one or more of the plurality of searches into a search session based on the determined time; grouping searches in the search session into a sub-session; and determining an intended search of the sub-session. In another embodiment, the method comprises determining a similarity of each search of a plurality of searches; and mapping each search of the plurality of searches to an intended search based on the determined similarity.

19 Claims, 6 Drawing Sheets

(56)                References Cited

U.S. PATENT DOCUMENTS

| | | | |
|---|---|---|---|
| 2010/0005492 A1 | 1/2010 | Takano et al. | |
| 2010/0070507 A1 | 3/2010 | Mori | |
| 2011/0137933 A1* | 6/2011 | Pelenur | G06F 16/9577 |
| | | | 707/769 |
| 2011/0243529 A1 | 10/2011 | Oryoji et al. | |
| 2014/0149344 A1 | 5/2014 | Pudipeddi et al. | |
| 2014/0279756 A1 | 9/2014 | Whitman | |
| 2015/0082330 A1 | 3/2015 | Yun et al. | |
| 2015/0100987 A1 | 4/2015 | Whitman et al. | |
| 2015/0269488 A1 | 9/2015 | Galai et al. | |
| 2016/0364460 A1* | 12/2016 | Shuster | G06F 3/0488 |
| 2017/0311015 A1 | 10/2017 | Docherty et al. | |
| 2019/0057401 A1* | 2/2019 | Subramanya | G06F 16/9535 |
| 2020/0252690 A1 | 8/2020 | Docherty et al. | |
| 2020/0320147 A1* | 10/2020 | Bacha | G06F 16/953 |
| 2021/0201351 A1* | 7/2021 | Nag | G06F 16/24534 |

FOREIGN PATENT DOCUMENTS

| | | |
|---|---|---|
| GB | 2 574 581 A | 12/2019 |
| WO | WO-01/15449 A1 | 3/2001 |
| WO | WO-02/27526 A1 | 4/2002 |
| WO | WO-2008/042242 A2 | 4/2008 |
| WO | WO-2013/130834 A1 | 9/2013 |
| WO | WO-2013/186061 A1 | 12/2013 |

* cited by examiner

Table 3 – CRE learning tables

| Section Number | DB Table name |
|---|---|
| Subscriber Timeslot Learning tables | |
| 10.1 | re_sub_ts_learned_language |
| 10.4 | re_sub_ts_content_item_ratings |
| 10.5 | re_sub_ts_feature_ratings |
| 10.6 | re_sub_ts_watched_episodes |
| | |
| Customer Learning tables: | |
| 7.1 | re_customer_learned_language |
| 7.4 | re_content_item_ratings |
| 7.5 | re_feature_ratings |
| 7.6 | re_customer_watched_episodes |
| | |
| Session Learning tables | |
| 12.1 | re_session_learned_language |
| 12.4 | re_session_content_item_ratings |
| 12.5 | re_session_feature_ratings |
| 12.6 | re_session_watched_episodes |
| | |
| Cookie Learning tables | |
| 14.1 | re_cookie_learned_language |
| 14.4 | re_cookie_content_item_ratings |
| 14.5 | re_cookie_feature_ratings |
| 14.6 | re_cookie_watched_episodes |
| | |
| Subscriber Combined Learning tables | |
| 9.1 | re_sub_learned_language |
| 9.4 | re_sub_content_item_ratings |
| 9.5 | re_sub_feature_ratings |
| 9.6 | re_sub_watched_episodes |

Figure 4

METHOD OF PROCESSING CONTENT SEARCHES

TECHNICAL FIELD

The present disclosure relates generally to a content recommendation system and method, and in particular, to a method of processing searches input into a content recommendation engine.

BACKGROUND

Developments in technology, for example, the advent of digital television, internet enabled video-on-demand services and the availability of personal video recorders has led to consumers altering their viewing habits including how, where and when they consume video and other content. Furthermore, the amount of content that is available via many systems has expanded enormously.

In this context, during a viewing session, a viewer is faced with a very large choice of what to watch from a wide range of available content sources. Faced with such a large choice a viewer may view or otherwise consume content they are already familiar with rather than try something new.

The large choice of content and the increased variety of content sources has led to various technical developments to enable users to better access and select content, for example developments to electronic programme guides (EPGs). It is also known for viewers to filter the large choice of content using a search function. However, both approaches can result in viewers continuing to view content with which they are already familiar. Ultimately, this can lead viewers to become dissatisfied as they may feel they are not exploiting the system and range of content to the full. It can be frustrating and time consuming for a user to seek out suitable new content available from the wide range of choices available from TV and other content service providers.

For example, personal video recorders have the capability of recording and storing content items from live linear television broadcasts and downloading and storing content items from video on demand services. As such, the content items stored on such devices provide a content source that is unique to the owner of the personal video recorder.

It has been suggested to provide viewers with content recommendations, which may lead them more rapidly to content that may be of interest. For example, applicant's own U.S. Pat. No. 11,343,573, the relevant portions of which are incorporated herein, describes such a content recommendation system.

Such a recommendation system may be based on user data and/or an input search term. Inputting a search term may be cumbersome, difficult and/or time consuming. As a results users may encounter difficulties when searching for content. It may be beneficial to process input search to understand, quantify and/or address these difficulties. Accordingly, improvements and/or alternatives in processing searches are desired.

This background serves only to set a scene to allow a person skilled in the art to better appreciate the following description. Therefore, none of the above discussion should necessarily be taken as an acknowledgement that that discussion is part of the state of the art or is common general knowledge. One or more aspects/embodiments of the disclosure may or may not address one or more of the background issues.

SUMMARY OF THE INVENTION

In TV systems, or other systems for provision of content to a user, each service provider may have thousand, tens or hundreds of thousands, or millions of customers, wherein each customer is unique and may have different viewing habits and preferences. The large choice of content and the increased variety of content sources has led to various technical developments to enable users to better access and select content, for example developments to electronic programme guides (EPGs). For example, viewers may filter the large choice of content using a search function.

Users may enter a search into the search function to search for content of a content distribution system. The search may comprise audio or text information indicating desired content a user wishes to access. The text information may comprise a string of characters. The search may be input into a content recommendation engine (CRE) which receives the search and provides one or more content recommendations based on the input search. The CRE may perform a search of a content library based on the inputted search. The CRE then provides content recommendations to the user who may then access content of interest. The user may view the provided content.

A user may input consecutive searches or searches requests as the CRE is providing content recommendations. As such, a user may input a plurality of searches prior to selecting content. It may be beneficial to understood how many searches a user input prior to selecting content, or if content was even selected. Additionally, it may beneficial to know what the user's intended search was as they may differ from the inputted search due to spelling errors, lack so knowledge of the content catalogue or other factors. Accordingly, improvements and/or alternatives in processing searches are desired.

According to an aspect of the disclosure, there is provided a method of processing searches, the method comprising:

determining a time between consecutive searches of a plurality of searches;

grouping one or more of the plurality of searches into a search session based on the determined time(s);

grouping searches in the search session into a sub-session; and determining an intended search of the sub-session.

By determining an intended search of a sub-session, a content distributor may be able to understand the effectiveness of their search and/or content recommendation system. For example, if the intended search term is determined to be content which was not presented to a user inputting the searches, search processing may be ineffective or require. Additionally or alternatively, the intended search may not form part of an available content catalogue indicating the intended search should be obtained.

Determining the intended search of the sub-session may comprise determining the intended search of all searches in the sub-session.

The intended search may comprise an intended search term or expression. The intended search may comprise content, e.g., television shows, episodes, film and/or music content.

The searches may be processed after being input by a user, or a plurality of users of a content distribution system. In other words, the method may be a post-processing method.

The searches may be input into a content recommendation engine (CRE), the CRE adapted to receive searches and provide one or more content recommendations based on the received searches for a user of a content distribution system having a plurality of users. The searches may be input into a search module of the CRE. The search module may be part of the CRE for providing content recommendations viewable to a user inputting the searches.

The searches may be text-based, auditory or any form of searches input for viewing and/or selecting content of a content distribution system. Each search may comprise a string of characters.

Each search may correspond to a search term or expression. Each search may comprise a search request, i.e., a request for content of a content catalogue of a content distributor.

The searches may be input consecutively. In other words, the searches may be input one after another. An inputted search may follow and/or be preceded by another inputted search. Consecutive searches may be separated by some amount of time. The time between searches may be defined as t in seconds. If the time t between consecutive searches is less than a threshold, the searches may be grouped together in a search session. Searches grouped together in a search session may indicate a single search session of a user. In other words, consecutive searches which are entered in a time t which is less than a threshold may be entered in a single search session by a user during which the user is searching for a particle intended search, i.e., a particular intended content. Multiple searches may be grouped into a single search session.

The method may further comprise:

determining a similarity of searches in the sub-session. The similarity may require a comparison between the searches in the sub-session or the searches and other available elements.

Determining a similarity of searches may comprise comparing searches in the sub-session to at least one parameter.

Determining a similarity may comprise determining a similarity score. Determining a similarity score may comprise applying a mathematical function to determine a similarity score between an inputted search and the parameter. The resulting score may comprise a value between 0 and 1 where value closer to 1 indicates a closer match between the inputted search and the parameter.

Comparing may comprise determining a textual relationship between searches and the parameter. The textual relationship my comprise comparing a string of characters of the search with a string of characters of the parameter. The comparison may result in a similarity score. The similarity score may range from 0 to 1 where values closer to 1 indicate a more likely match, and a value of 1 indicates an exact match. The similarity score may have an associated confidence level indicating a level of confidence associated with the associated similarity score.

The textual relationship may comprise at least one search being a substring of the parameter. The search may comprise a string that is a substring of the parameter. For example, the search string may comprise "game of" while the parameter comprises "game of thrones".

The parameter may comprise at least one of:
learn actions;
content metadata; and
user metadata.

Learn actions may be records of user activity, e.g., each time a particular user has watched or recorded a programme at any time during the previous six months or other relevant time period. Each learn action may have its own data item, e.g., a table entry, in stored user data. In other words, when a user performs an action, such as watching a programme for a period of time, the user activity may be recorded in the form of a learn action. The learn action may include an indication of the start and stop time the programme was watched, and/or a duration the programme was watched. The learn action may further indicate the programme information. This may include metadata associated with the programme such as content title; time; duration; content type; program categorization; genre; release date; episode number; series number; actor; audience; award; language; category; character; character type; concept source; director; format; franchise; host; milieu; mood; producer; person; singer; subcategory; scenario; setting; sports competition; studio; style; subject; team; theme; time period; and writer.

Learn actions may comprise user selected content of the content distribution system. Determining a similarity may comprise comparing searches in the sub-session to learn actions. Determining a similarity may comprise comparing search in the sub-session to learn actions comprising clicked-on search result (COSR). COSR may indicate that a particular content item was selected for viewing and/or additional information.

Content metadata may comprise metadata associated with content of the content distribution system. Metadata associated with content may comprise content title; time; duration; content type; program categorization; genre; release date; episode number; series number; actor; audience; award; language; category; character; character type; concept source; director; format; franchise; host; milieu; mood; producer; person; singer; subcategory; scenario; setting; sports competition; studio; style; subject; team; theme; time period; and writer.

User metadata may comprise metadata associated with a user or a user profile associated with a user. The user or user profile may be associated with the inputted searches. Metadata associated with the user or user profile may comprise age; age range; viewing preferences including genre, language preference, actors and directors; and term of membership to content distribution system associated with the user or user profile.

The content may comprise one or more of: television content; video content, audio content, visual content, computer games, printed content, text-based content, live performances, movies, TV programs, music, podcasts, talking books, computer games, books, magazines, news, recipes, concerts, plays, comedy performances, entertainment or sporting events.

The method may further comprises determining a similarity of each search in the sub-session. The similarity may be determined in the manner described.

Determining the intended search may comprise determining the intended search based on the determined similarity. Determining the intended search based on the determined similarity may comprise determining the intended search term based on the similarity exceeding a threshold. The similarity may comprise a similarity score. The threshold may comprises a threshold similarity score. The similarity score may be a value between 0 and 1. The threshold may comprise 0.9, 0.95 or some other value.

Determining the intended search term comprises selecting the search with the highest similarity. The highest similarity score may indicate the most likely search term or expression desired by the user when inputting the search or searches of the sub-session.

The method may further comprise:
categorising each search in the sub-session based on the determined similarity. Categories may comprise LOW, MID-LOW, MID-HIGH and HIGH. Each category may correspond to a range of similarity or similarity score. For example, LOW may correspond to a range of 0 to 0.9. MID-LOW may correspond to a range of 0.9 to 0.95. MID-HIGH may correspond to a range of 0.95 to 0.98. HIGH may correspond to a range of 0.98 to 1.00.

The method may further comprise:

determining an intended search based on an additional input. The additional input may be inputted by a user following inputting a search. The additional input may be related to content recommendations returned as a result of the search. The additional input may be related to the inputted search. The additional input may narrow or restrict content recommendations. For example, if a user input "doctor" as the search, a content recommendation engine (CRE) which receives the input may return an option to select "medical" content as a genre of the content to be returned. The selection of "medical" content by a user may provide the additional input to the CRE. The CRE then provide updated content recommendations based on the inputted search "doctor" and the additional input "medical" genre.

The additional input may comprise a facet of content, i.e., content metadata. The facet may comprise at least one of genre; content type; genre; release date; actor; audience; award; language; category; character; character type; concept source; director; format; franchise; host; milieu; mood; producer; person; singer; subcategory; scenario; setting; sports competition; studio; style; subject; team; theme; time period; and writer.

The described parameter may be selected based on the additional input. For example, if the parameter comprises content metadata, the content metadata may include the additional input.

The method may further comprise:

determining the intended search for each sub-session in the search session.

The method may further comprise:

(determining a number of sub-sessions.

(Grouping one or more of the plurality of searches into a search session comprises grouping the consecutive searches into the search session if the time is below a threshold. For example, if the time is less than 1, 5, 15, 60 or some other number of seconds, consecutive searches may be grouped into the same sessions whereas if the time is greater than the set number of seconds, consecutive may be placed in separate sessions. The threshold may be pre-set prior to processing.

The method may further comprise at least one:

determining a search session duration; and determining a sub-session duration. The duration may be the elapsed time between a first and a final search in the session/sub-session being input. A greater elapsed time may indicate a user took substantial time to find the intended search, i.e., the desired content. A shorter elapsed time may indicate a user was able to quickly find the intended search, i.e., the desired content.

Determining the search session duration may comprise summing time between searches for all searches in the search session. Determining the sub-session duration comprises summing time between searches for all search in the sub-session.

The method may further comprise:

determining a similarity of the searches in the search session. Determining a similarity of searches may comprise comparing searches in the sub-session to each other.

Determining a similarity may comprise determining a similarity score. Determining a similarity score may comprise applying a mathematical function to determine a similarity score between searches in the sub-session to each other. The resulting score may comprise a value between 0 and 1 where value closer to 1 indicates a closer match between inputted searches.

Determining a similarity may comprise determining a textual relationship between inputted searches. The textual relationship my comprise comparing strings of characters of the searches. The comparison may result in a similarity score. The similarity score may range from 0 to 1 where values closer to 1 indicate a more likely match, and a value of 1 indicates an exact match. The similarity score may have an associated confidence level indicating a level of confidence associated with the associated similarity score.

The textual relationship may comprise a search being a substring another search. The search may comprise a string that is a substring of another search. For example, the search string may comprise "game of" while another search string comprises "game of thrones".

Determining the similarity of the searches in the search session may comprise:

determining a similarity score between searches in the search session.

Grouping searches into a sub-session may comprise grouping searches into the sub-session based on the similarity, i.e., the similarity determined between searches.

The method may further comprise at least one of:

categorising the plurality of searches; and filtering the plurality of searches based on the categories. Possible categories include content title; time; duration; content type; program categorization; genre; release date; episode number; series number; actor; audience; award; language; category; character; character type; concept source; director; format; franchise; host; milieu; mood; producer; person; singer; subcategory; scenario; setting; sports competition; studio; style; subject; team; theme; time period; and writer.

Categorising may comprise categorising the plurality of searches based on a number of characters in each search.

Filtering may comprise:

filtering searches in each sub-session. Grouping searches in the search session into a sub-session may be achieved by filtering the search in each sub-session. Searches may be filtered based on the categories.

According to another aspect there is provided, a method of processing searches, the method comprising:

determining a similarity of each search of a plurality of searches; and mapping each search of the plurality of searches to an intended search based on the determined similarity.

The searches may be input into a CRE, the CRE adapted to receive searches and provide one or more content recommendations based on the received searches, e.g., search requests, for a user of a content distribution system having a plurality of users.

Determining a similarity may comprise comparing each search of a plurality of searches to at least one parameter. Determining a similarity may comprise determining a similarity score. Determining a similarity score may comprise applying a mathematical function to determine a similarity score between an inputted search and the parameter. The resulting score may comprise a value between 0 and 1 where value closer to 1 indicates a closer match between the inputted search and the parameter.

Comparing may comprise determining a textual relationship between each search and the parameter. The textual relationship my comprise comparing a string of characters of the search with a string of characters of the parameter. The comparison may result in a similarity score. The similarity score may range from 0 to 1 where values closer to 1 indicate a more likely match, and a value of 1 indicates an exact match. The similarity score may have an associated confidence level indicating a level of confidence associated with the associated similarity score.

The textual relationship may comprise at least one search being a substring of the parameter. The search may comprise a string that is a substring of the parameter. For example, the search string may comprise "game of" while the parameter comprises "game of thrones".

The textual relationship my comprise comparing a string of characters of the search with a string of characters of the parameter. The comparison may result in a similarity score. The similarity score may range from 0 to 1 where values closer to 1 indicate a more likely match, and a value of 1 indicates an exact match. The similarity score may have an associated confidence level indicating a level of confidence associated with the associated similarity score.

The textual relationship may comprise at least one search being a substring of the parameter. The search may comprise a string that is a substring of the parameter. For example, the search string may comprise "game of" while the parameter comprises "game of thrones".

The intended search may be determined based on the determined similarity.

The method may further comprise determining an intended search. Determining the intended search based on the determined similarity may comprise determining the intended search term based on the similarity exceeding a threshold. The similarity may comprise a similarity score. The threshold may comprises a threshold similarity score. The similarity score may be a value between 0 and 1. The threshold may comprise 0.9, 0.95 or some other value.

Determining the intended search term comprises selecting the search with the highest similarity. The highest similarity score may indicate the most likely search term or expression desired by the user when inputting the search or searches of the sub-session.

The method may further comprise:

assigning a confidence to each search of the plurality of searches based on the determined similarity.

The confidence may comprise confidence level. The confidence may indicate a level of confidence associated with the associated similarity or similarity score.

The method may further comprise:

generating a search repository of the mapped searches.

The search repository may comprise a look-up table which may be used when determining the intended searches of subsequent inputted searches. For example, if an inputted search is mapped to a particular intended search and forms part of the search repository, it may be determined that a subsequent inputted search matching the original inputted search has the same associated intended search. This may reduce processing time.

Generating the search repository may comprises generating the search repository of mapped searches exceeding a threshold similarity. The search repository may only include searches mapped to intended searches where the similarity exceeds a threshold. The threshold may be a particular similarity score, e.g., 0.950. The threshold may be a particular similarity range, e.g., HIGH or MIG-HIGH as previously described. Searches that map intended searches which are below the threshold may not be included in the search repository.

The search repository may also include searches that are not mapped to any intended search. This information may be valuable in determining that a desired content is not available in a content depository.

The method may further comprise:

determining an intended search of a new search based on the search repository.

Determining an intended search of a new search may comprise selecting an intended search from the searched repository, the intended search mapped to a search from the mapped plurality of searches which is related to the new search. The mapped search may correspond or match the new search. Selecting the intended search may comprise finding a search in the repository that matches the new search. Selecting the intended search may comprise finding a search in the repository that at least partially matches the new search. The new search may be compared to a search in the repository and a match may be made based on the comparison.

The new search may be identical to the search mapped to the determined intended search.

The method may be computer-implemented, i.e., implemented by one or more computer processors.

According to another aspect there is provided a non-transitory computer-readable medium having computer program code stored thereon, the program code executable by a processor to perform a method according to any of the described aspects.

According to another aspect there is provided a computer program product comprising computer-readable instructions that are executable to perform a method according to any of the described aspects.

According to another aspect there is provided a system comprising:

a processor; and memory having computer program code stored thereon, the code executable by the processor to perform a method according to any of the described aspects.

Features in one aspect may be provided as features in another aspect. For example, method features may be provided as apparatus features and vice versa.

BRIEF DESCRIPTION OF THE DRAWINGS

Various aspects of the invention will now be described by way of example only, and with reference to the accompanying drawings, of which:

FIG. 4 is a representation of information stored on a hard disk storage resource;

DETAILED DESCRIPTION

In TV systems, or other systems for provision of content to a user, each service provider may have thousand, tens or hundreds of thousands, or millions of customers, wherein each customer is unique and may have different viewing habits and preferences. It has been recognized pursuant to the present invention that each may require different content recommendations. Tracking, recording and processing large volumes of customer data together with large amounts of content data in order to provide a personalized recommendation within the time constraints demanded by a viewer and by the system poses a significant technical challenge. The time constraints demanded by particular content providers, or expected by users, for provision of recommendations may be particularly demanding, with content recommendations being required to be generated almost instantaneously, for example within a few hundred milliseconds of a user switching on a set top box or otherwise beginning a viewing session. This can present a significant technical challenge, particularly as the content recommendation system is usually hosted on a server remote from the set top box and, for systems with millions of subscribers, may have to deal simultaneously with hundreds of thousands of content recommendation demands per minute during busy periods. Additionally users may be searching for content resulting in thousands, hundreds of thousands, and even millions of searches being processed. These searches may be processed to return content recommendations for viewing or further information. Further, these searches may be post-processed along with other information such as the content recommendations returned or the content viewed by a user following the content recommendation.

Figure 1:
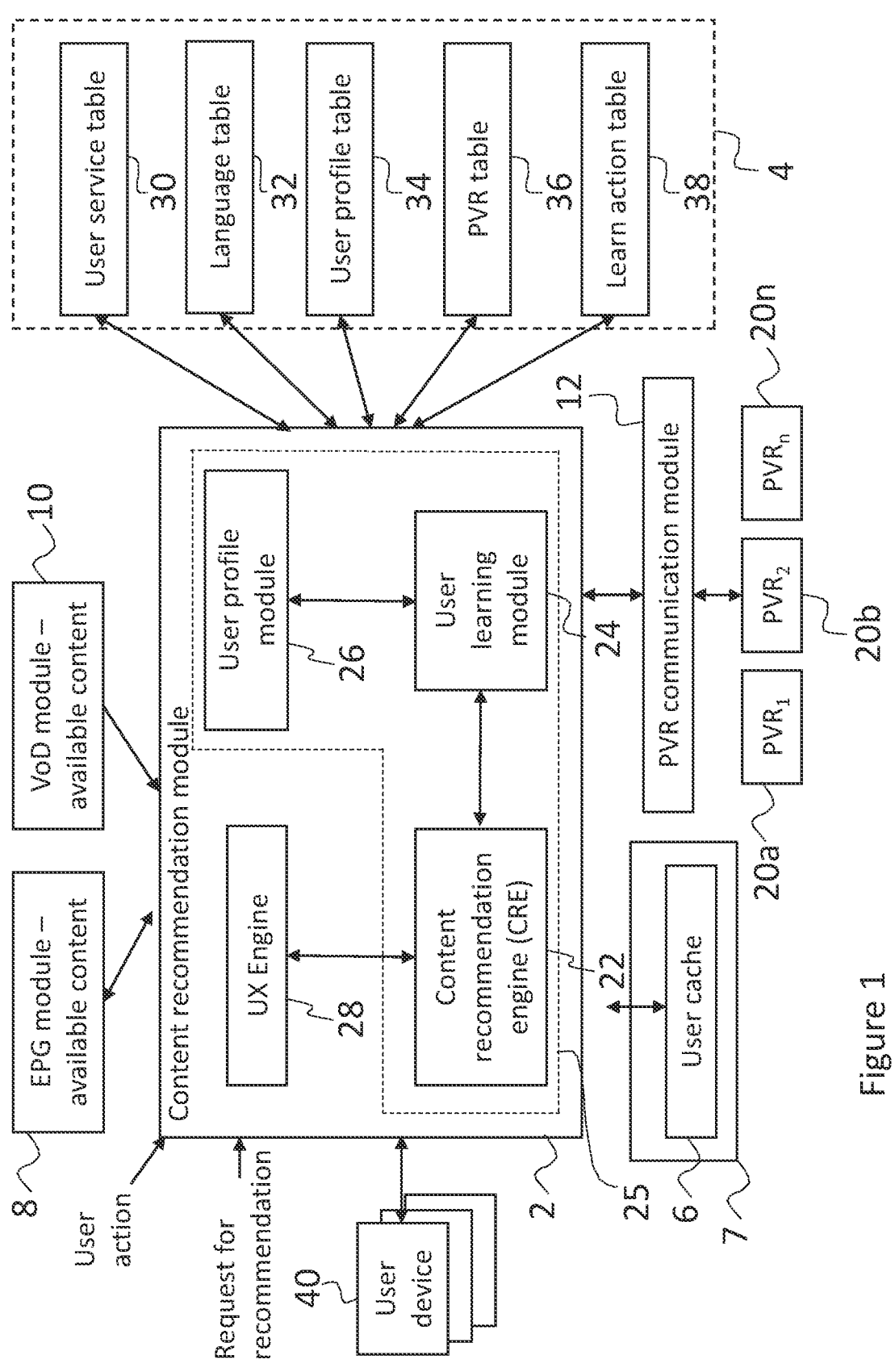
FIG. 1 is a schematic diagram of a digital content recommendation system.

FIG. 1 shows a schematic diagram of a digital content recommendation system according to an embodiment. The system is able to provide content recommendations in real time or near real time for many thousands, tens of thousands or even hundreds of thousands or more users. Example modes of operation are described below in relation to PVRs associated with users, but content recommendations may be provided to or in respect of any suitable users or user accounts, with recommended content being provided or accessible via any suitable devices, for example set-top boxes, smartphones, PCs or tablets or any other suitable content delivery mechanism.

The system comprises a content recommendation module 2 linked to a first storage resource in the form of a hard disk storage device 4, which is used to store various user data. The content recommendation module 2 is also communicatively linked to a second storage resource in the form of a local storage device that includes at least one cache, for example a user cache 6. In the embodiment of FIG. 1 the local storage device is in the form of RAM, but any suitable storage device may be used in alternative embodiments. The user cache 6 may be used for temporary storage of user data obtained from the hard disk storage device 4 during a content recommendation session, as discussed in more detail below. While the system has been illustrated and described as comprise first and second storage resources, one of skill in the art will appreciate more or less storage resources may be present. For example, the system may comprise a single storage resource. The storage resource may comprise a hard disk storage device.

The content recommendation module is able to communicate, either directly or indirectly, and either via wired or wireless connection, with very large numbers of users or user devices 40 and to provide recommendations for or derived from such users or user devices. Other than some PVRs which are shown schematically in FIG. 1, only a few user devices 40 are shown in FIG. 1 for clarity. The user devices 40 may include, as examples only, a user's mobile phone, smart TV, tablet computer, laptop, smart watch or other suitable viewing device. Although the user devices 40 could belonging to a user, they could also comprise any other device that the user is logged into.

The content recommendation module 2 is also linked to sources of information concerning available content, in this case an EPG module 8 and a Video-on-Demand (VoD) module 10 which provide information concerning content available to a user via an EPG (for example, scheduled TV programmes on a set of channels) and via a VoD service. In alternative embodiments, a variety of other sources of content may be available as well as, or in addition to, EPG and VoD content, for example internet content and/or any suitable streamed content via wired or wireless connection.

In the embodiment of FIG. 1, the EPG module 8, the VoD module 10, Content Recommendation Module 2, the User Cache 6, the PVR Communication module 12 and the EPG module 8 are implemented in a server. The server includes communication circuitry that enables communication between the server, or appropriate components of the server with each of the user devices, and with the content sources, for example a TV service operator or other content service operator.

Any other suitable implementation of the EPG module 8, the VoD module 10, content recommendation module 2, the user cache 6, the PVR communication module 12 and the EPG module 8 may be provided in alternative embodiments, for example they may be implemented in any software, hardware or any suitable combination or software and hardware. Furthermore, in alternative embodiments any one of the components as described in relation to the embodiment of FIG. 1 or other embodiments may be combined with any other one(s) of the components, or any one of the components may be split into multiple components providing the same or similar functionality.

The EPG module 8 and the VoD module 10 obtain information concerning available content from the content sources, for example a TV service operator or other content service operator. The content information comprises metadata of content, for example, television programme metadata. The metadata may be representative of a variety of different content parameters or properties, for example but not limited to programme title, time, duration, content type, programme categorisation, actor names, genre, release date, episode number, series number. It is a feature of the embodiment that the metadata stored at the EPG module 8 and the VoD module 10 may also be enriched with additional metadata, for example by the operator of the content recommendation system, such that additional metadata to that provided by the content sources or other external sources may be stored.

In the embodiment of FIG. 1 the content recommendation server, in particular the content recommendation module 2, communicates directly with each of the user devices, for example to receive user action data, to determine when a content recommendation is required for a particular user, and to supply content recommendations to the user devices. In alternative embodiments, the content recommendation module 2 communicates with the user devices via the content sources or via other servers or devices. For example, in such alternative embodiments, the user action data may be sent to the content recommendation server via one of the content source servers or other server or device, and the content recommendations may be sent to the user devices from the content recommendation module 2 via the content source servers or other server or device.

In the embodiment of FIG. 1 the system operates together with three sources of content for a user device: real-time linear television, for example terrestrial or satellite broadcast television; one or more video-on-demand (VoD) services, and pre-recorded video content stored on one or more personal video recorders (PVR). In alternative embodiments further sources of content as well as or instead of those shown may be used.

The operation of the digital content recommendation system is controlled by the content recommendation module 2. As can be seen in FIG. 1, the content recommendation module 2 is configured to communicate with the one or more content information modules: the electronic programme guide (EPG) module and VoD module 10. The content recommendation module 2 is also configured to communicate with the user cache 6 local to the content recommendation module 2, the hard disk storage resource 4 and the one or more PVRs. A data access layer provides a communication interface between the content recommendation module 2 and the hard disk storage resource 4. A personal video recorder (PVR) communication module 12 provides a communication interface between the one or more PVRs 20*a*, 20*b*, . . . 20*n* and the content recommendation module 2.

The content recommendation module 2 has a content recommendation engine (CRE) 22 and a user learning module 24. The CRE 22 applies a set of processes to determine, in real time, content recommendations for a user based on user data and available content. The user learning module 24 receives data indicative of selections or other actions by a user and builds up a set of user data, for example comprising or representing a user history or profile, which is stored in the hard disk storage 4, and which is used in generating personalized recommendations for the user. Operation of the CRE 22 and the user learning module 24 is discussed in more detail below.

Figure 2:
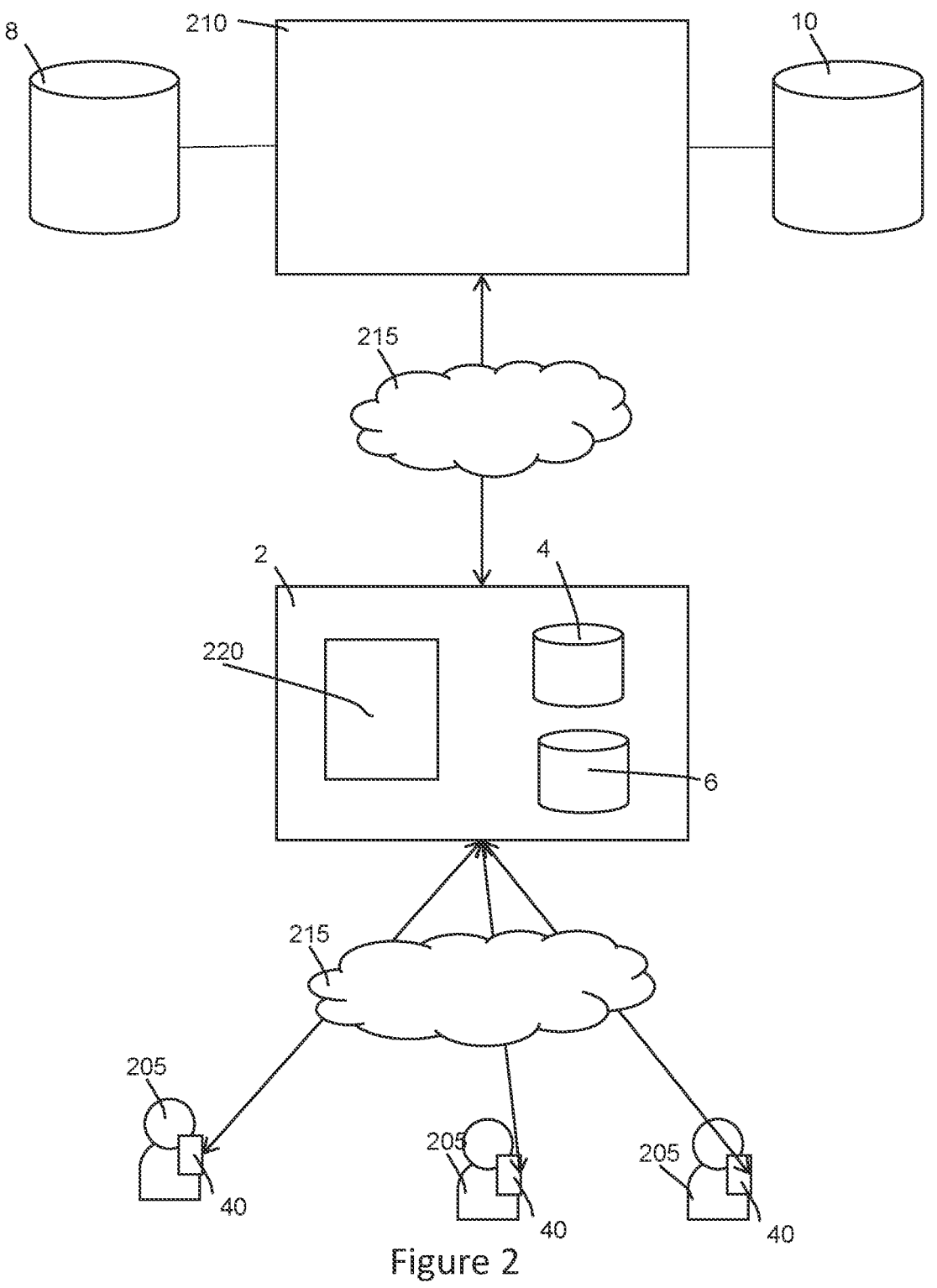
FIG. 2 is a simplified schematic of the system of FIG. 1.
Figure 3:
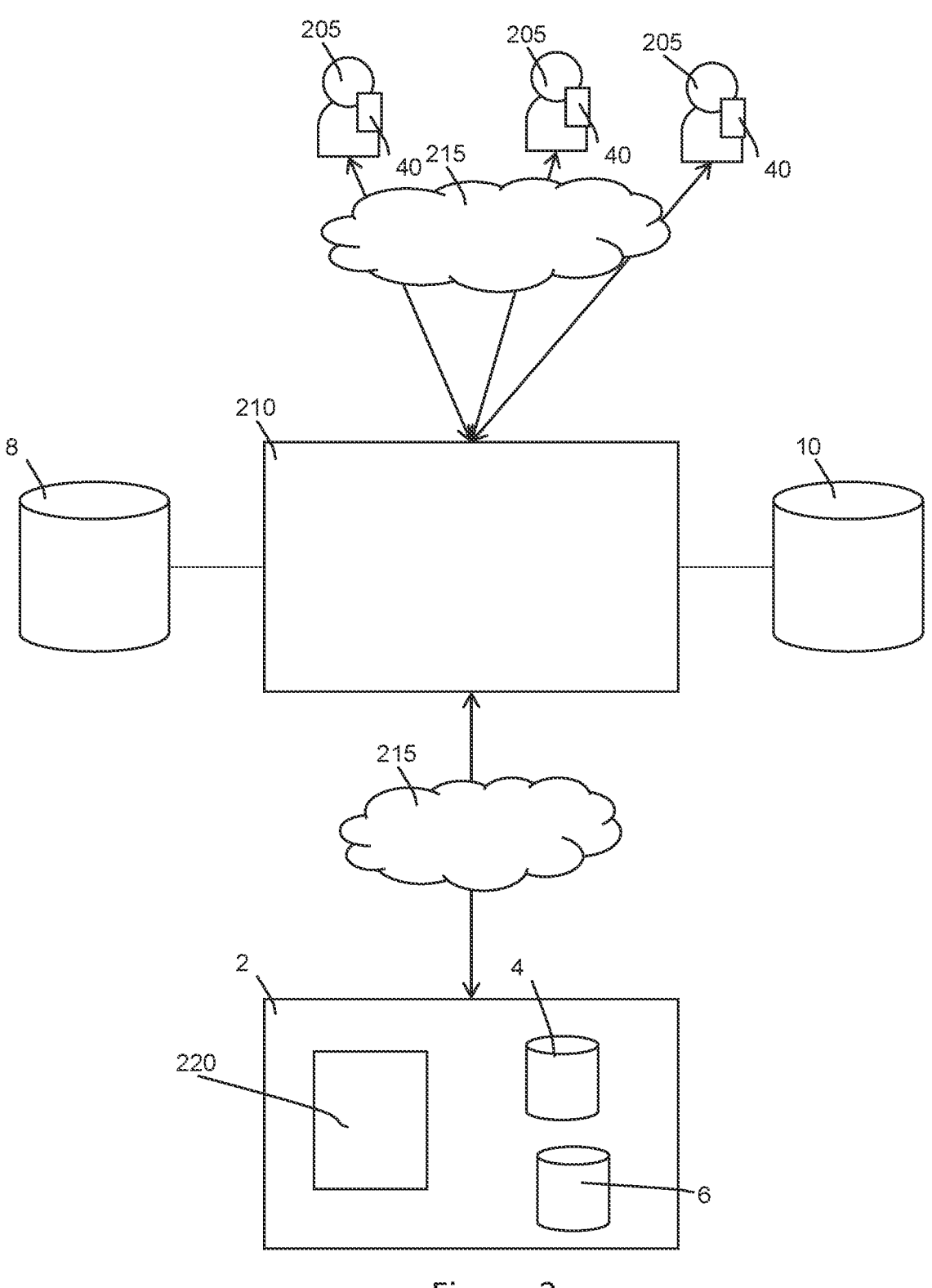
FIG. 3 is a simplified schematic of an alternative system arrangement to that of FIG. 2.

In this embodiment, the content recommendation module 2 further includes a user experience (UX) engine 28 for configuring user content selection interfaces that allow users 205 (see FIGS. 2 and 3) to navigate and select content from a content service provider (210, also shown in FIGS. 2 and 3). In particular, the UX engine 28 can be used to provide customised user content selection interfaces that are customised or otherwise specifically configured to a specific user 205 or group of users 205. The customization comprises customizing the order in which groups of content is presented to a user 205 or groups of users 205 so that groups of content more likely to be of interest to the user 205 are presented earlier, or in preference to groups of content that are less likely to be of interest to that user 205.

The content recommendation module 2 further includes a user profile module 26. The CRE 22, user learning module 24 and user profile module 26 may be included in a recommendation service 25.

As discussed in more detail below, the user profile module 26 is operable to use first party data obtained by an operator of the system to determine user activity profiles of individual users 205 or sets of users 205, which are representative of actions of a user 205 with respect to content selection interfaces.

FIG. 1 shows a request for recommendation for the user being received by the content recommendation module 2. FIG. 1 also shows a user action being received by the content recommendation module 2. In addition to receiving requests for recommendation, the content recommendation module 2 is configured to log user activity. By logging user activity and storing activity over an extended period of time, the content recommendation module 2 and the hard disk storage 4 can build up an overall picture of the viewing activities, habits and preferences of a plurality of users. As will be described in more detail, certain user actions are turned into learn actions by the user learning module 24. The learn action may be processed by the user profile module 26, the UX engine 28 and the content recommendation engine 22 as well. The user profile module 26 may store user data on the hard disk storage 4 to generate and update one or more user profiles for users 205.

The system of FIG. 1 is configured to operate with a plurality of user devices (not shown) each associated with at least one user. The plurality of user devices may comprise a large number of devices, for example thousands, tens or hundreds of thousands, or even millions of devices. Each user device may be any device or combination of devices that is configured to enable a user to view or otherwise consume content. For example, each user device may be an internet-enabled device and/or a device for providing video or other content on demand and/or a device capable of receiving a real-time linear television broadcast signal. The user device may be a mobile device, for example a tablet, a smart phone or a laptop. Alternatively, the user device may not be mobile, for example, an internet browser enabled computing device, a smart television or a set-top box. The user device may also have an in-built or associated PVR for recording and storing content in some embodiments.

The user may be a viewer of the user device. Alternatively or additionally, the user may be a subscriber and/or customer of a service accessible through the user device.

The user device is communicatively coupled to the content recommendation module 22. The CRE 22 of the content recommendation module 2 has an application programming interface (the recommendation engine API) that provides a set of rules for search and recommendation requests to be communicated between the user device and the CRE 22. The user device is configured to send a recommendation request, directly or indirectly, to the CRE 22.

The user cache 6 is coupled to the content recommendation engine 22 and is configured to store data for the content recommendation engine 22. The content recommendation module 2 can access data stored on the user cache 6. The user cache 6 may be provided in random access memory (RAM) 7.

The hard disk storage 4 is communicatively coupled to the content recommendation module 2. The hard disk storage 4 stores data for use by the content recommendation module 2. The hard disk storage 4 is configured to store one or more databases. Entries from the databases on the hard disk storage resource 4 can be retrieved by the content recommendation module 2 via requests made through the data access layer. Entries in the databases may also be updated via the data access layer.

The database(s) at the hard disk storage 4 store user data that is used by the CRE 22 to generate content recommendations. In the embodiment of FIG. 1 a set of database tables is provided that store information concerning the users.

In the embodiment of FIG. 1, the tables may include at least one user service table 30 that represent user service requirements, at least one language table 32, at least one user profile table 34 that includes user attribute data that may be considered to represent a user profile, a PVR table 36 and a learn action table 38.

The learned language table 32 stores data relating to audio languages of content items that have been user actioned by the user. For example, the feedback table can store learned language information, the date at which the language was learned and an indication of whether or not the entry has been aged out.

A user profile, which is stored in the user profile table 34, may include, for example, the following attributes: unique identifiers, for example a user identifier, a subscriber identifier, an anonymous session identifier; one or more unique geographic identifiers; a flag indicating whether or not the user has a PVR; a flag indicating whether or not the user is in debt; a flag indicating whether or not the user has opted out of receiving marketing material; one or more codes indicating one or more preferred languages of the user; a flag indicating if the user has opted out of receiving personal recommendations; the age of the user; the name of the user and the gender of the user.

The PVR table 32 stores metadata or other information concerning items of content stored on at least one PVR, e.g., PVR 20a, 20b, . . . 20n, substantially without duplication (for example, substantially the same amount of data is stored regardless of whether an item of content is stored on one, thousands or millions of PVRs) the amount of storage required, and data access times can be reduced. This can be particularly significant in systems such as that of FIG. 1 which may be required to provide real-time personalized content recommendations to thousands, tens or hundreds of thousands, or millions of users subject to strict time constraints.

Additionally, in the embodiment of FIG. 1, the tables stored on hard disk storage device 4 may include various user learning tables that include data representing for example the viewing activities, habits and preferences of each user. The user data can include data representing for examples explicit ratings given by a user to a particular programme or other item of content. It is a feature of the embodiment of FIG. 1 that the user data also includes data representing actions, for instance viewing actions, taken by a user.

For example, if a user selects a programme or other item of content and views or otherwise consumes it for greater than a threshold period of time then a learn action is generated and at least one user data item for that user is stored in a learn action table 38. The learn action (i.e., stored data item) may include various data including for example start and stop viewing time, time slot identifier, programme identifier, at least some metadata concerning the programme (although such metadata may be stored separately as content data rather than user data in some embodiments, and linked to or otherwise accessed if required, for example by the programme name or other identifier).

Although a particular system arrangement is shown in FIG. 1, there are various system arrangements that could be used.

FIG. 2 shows a "middleware" arrangement in which the recommendation system 2 sits as "middleware" between the users 205 and systems of a content provider 210. The recommendation system 2 is implemented by processing resource 220 (which may comprise one or more processors) with the storage device 4 and user cache 6. In some examples, the recommendation system 2 can be implemented by a cloud computing system, by one or more servers or other suitable enterprise level computing system. In this arrangement, systems that implement the recommendation system 2 receive data sent from the user devices 40 of the users 205 that represents the user actions/user activity taken by the user 205 that are relevant to the content selection interface, such as but not limited to actions taken by the user 205 during operation of the content selection interface, including one or more of the user actions listed above. The user devices 40 also provide a user ID that can be used to identify the user 205 to allow the provision of a content selection interface that is customized for that user 205. The user devices 40 communicate the data over a network, such as the cloud 215, to the recommendation system 2. The recommendation system 2 records the user actions in order to generate learn actions and build and update a user profile that can be used to configure and customize a content selection interface for the user 205. The recommendation system 2 can communicate the requests and other data from the user devices 40 to the content providers systems 210 in order to provide the content to the user devices 40.

Other system arrangements that provide similar functionality to customize the content selection interfaces for users are possible. FIG. 3 shows an alternative system configuration in a "backend" processing arrangement. In this arrangement, the user devices 40 interface directly with the systems of a content provider 210, which implements the content selection interface and handles the requests from the user devices 40. User interaction data from the user devices 40 is provided by the systems of a content provider 210 to the recommendation system 2 in order for the recommendation system 2 to identify learn actions and build user profiles for at least partly customizing the content selection interface for that user. The recommendation system 2 provides the data for customizing the content selection interface for that user, including an ordering with which to present at least some of the groups of content in the user selection interface, to the systems of a content provider 210 for providing in the content selection interface for that user 205.

Returning now to FIG. 1, in the learning tables described, e.g., the learn action table 38, a distinction is made between different types of user and different sets of the tables are stored for the different types of users. FIG. 4 is a representation of certain database learning tables stored on the hard disk storage resource 4 of the embodiment of FIG. 1.

The content recommendations engine 22 supports different categories of user. The categories or types in this embodiment are: customer, subscriber and anonymous. Subscriber can, for example, refer to combined subscriber mode or time-slot subscriber mode. Anonymous can, for example, refer to cookie and/or session modes.

A customer may be a user who uses a service or content source. A customer profile may store one or more of the following attributes in some embodiments: preferred features; indication of preferred viewing times e.g. day, start and end times. The customer profile table also stores a list of the favourite content item group information: content source (e.g. EPG or VOD) and unique identifiers for content item groups.

A subscriber may be a person who has subscribed to a particular service rather than the individual user who is using the service. For example, the subscriber can be an account holder or an entity that represents a household. Individual users may be associated with a subscriber. There are at least two modes of operation of subscriber profiles. The first is combined mode, where data for the subscriber (for example attributes and/or subscriber actions) are used to generate content recommendations. In that case, the content recommendations may be based on attributes and/or user actions for a plurality of users associated with the same subscription, for example different members of the same household. The second is time-slot mode where content recommendations are generated in dependence on the particular time slot in question. For example user data generated for a particular time slot may be used selectively in generating content recommendations for a particular time slot (potentially with user date generated for other times slots being ignored or weighted to be of less significance) and/or with different rules and/or attributes being used for different time slots. For instance, there may be a rule that no adult content be recommended for morning or afternoon time slots, only for late evening or night-time time slots. Similarly, greater weighting may be given to children's programmes for certain time slots, for instance late afternoon time slots, making recommendations of children's programmes more likely during those time slots.

Anonymous profiles are used to recommend content when neither the individual customer nor subscriber to a service is known. For example, for a web user who has not logged in is an anonymous user. There are two modes of operation of anonymous profiles. These are session mode (either single-session or multi-session mode) and cookie mode.

In single-session mode preferences of the anonymous consumer are stored in memory for the duration of a single session and then removed from memory at the end. In multi-session mode preferences of the anonymous consumer are kept in memory over more than one session. The anonymous profile is identified over more than one session using a unique session id stored in the anonymous profile.

In cookie mode, the recommendations engine 22 can perform anonymous session tracking using cookies, wherein on a first request a cookie containing the unique identification is added and in later sessions used to identify the anonymous user. This works in a web environment. A cookie session profile holds a list of cookies that are known to the system together with data referring to when the cookie was created or last accessed by the content recommendations engine 22.

For each user of all categories, the content recommendations engine 22 has separate groups of learning tables. In FIG. 4, the learning tables shown are "learned language", "exclude content group", "content item ratings", "feature ratings" and "watched episodes". These tables are shown by way of example. Other tables may also be stored in the embodiment of FIG. 1. Each user may have explicit preferences and implicit preferences. Explicit preferences are information the consumer tells the system by, for example, by entering a questionnaire. Implicit preferences are information learned by the system through user actions. Data corresponding to user actions for the purpose of learning are stored in the learning tables.

The exclude content group table stores data corresponding to content explicitly excluded by the user. For example, the feedback tables also contain information on content items and content item groups that have been manually excluded by the customer. For example, for individual content items that have been excluded this information includes: identifier of the content item; content source; data and time of exclusion; series title of content item; client type ID (e.g. web, call centre, set-top box). For content item groups, this information includes: customer identifier, time and date content item group excluded; content source; client type ID. In both case, a flag is included that indicated whether or not the exclusion has been aged out.

The content item ratings table stores data representing features of content such as the features, actors, channels. Feature ratings allows learn actions to specify features of content information instead of the content item. A customer is capable of applying ratings to a content item. Rating information is stored in the customer feedback table and includes: time and date rating given; customer identifier; activity identifier; name and identifier of content item rated; content item group identifier if content item associated with a content item group; rating value; a scaled rating value to be used by the recommendation engine 22; feature ratings; content source ID; client type ID; series title of content item and content item instance identifier. A flag is also stored to indicate if the recommendation has aged out or not. A feature rating made by a customer can also be stored on a specific list of features and/or sub-genres.

The watched episodes table stores data corresponding to last actioned episode of a series actioned by a user. For example, for each customer the episode history for customers is stored. This includes a series identifier; a series title; a season and episode number, and the date and time the user action occurred.

In alternative embodiments, different data tables or combinations of data tables may be stored.

Additionally, the learn tables illustrated in FIG. 4 may include the learn action table 38 of FIG. 1. As will be described, the user learning module 24 determines whether user data should be stored in the learn action table 38 in respect of a particular user action or set of actions. For example, if a user only views a programme for a very short period of time, for instance if they are channel surfing, then user data is not stored in any of the user learning tables, e.g., the learn action table 38, in respect of that action. User data can be stored in respect of a variety of different user actions or events, for example selecting, viewing, recording or searching for content.

One mode of operation of the system of FIG. 1 will now be described. The system of FIG. 1 includes three sources of content for a user device: real-time linear television, for example terrestrial or satellite broadcast television; one or more VoD services, and pre-recorded videos stored on one or more PVRs. More or fewer sources of content may be present.

As a first stage, a user initializes a viewing session through a first initiation event. An initiation event can, for example, be a user logging on to a service provider or turning on the user device. The initiation event is communicated to the content recommendation module 2 via a communication channel between the user device, for example a set top box or other device, for example at the user's home or other remote location, and the content recommendation module 2. In the embodiment of FIG. 1 there is direct communication between the user device and the content recommendation module 2. In alternative embodiments, communication between the user device and the content recommendation module 2 is mediated or passes through, for example a content provider, for instance a TV system operator to which the user subscribes.

In response to the initiation event, the user is then presented, via a display of the user device, with a content selection screen displayed on a display screen and/or user interface, which presents the user with a choice of viewing different content items from the content source. For an EPG content source, the content selection screen may form part of the EPG itself. For a VoD content source, a dedicated user interface may be presented. It is a feature of the embodiment of FIG. 1 that the choice of content items includes content recommendations generated by the content recommendation system of FIG. 1 and communicated to the user device. In one mode of operation it is a requirement that the content recommendations should be provided almost instantaneously, for example within a few hundred milliseconds, so that they can be included on the user interface together with other available items of content, for example live TV schedules, as soon as the user interface is displayed to the user.

In some embodiments, the initiation event may be treated automatically by the content recommendations module as being a request for recommendations for the user.

In response to the initiation event a start time to the viewing session is logged by the CRE 22, for example, to coincide with the initiation event, a content recommendation session is opened and user data, associated with the user, are retrieved from storage on tables in the hard disk storage resource 4 and loaded to the user cache 6 in RAM. The user data are maintained in RAM 7 throughout the content recommendation session.

The CRE 22 also maintains content data in the RAM, for example any suitable data relating to properties of the content, such as metadata obtained from the EPG module 8 and the VoD module 10. The content data stored in RAM 7 may be updated periodically or in response to changes in the data stored, for example, at the EPG module 8 and VoD module 10. By caching the content data in RAM processing and data access speed may be increased.

Following retrieval of user data and obtaining content source information, the CRE 22 is configured to use the user data located in the user cache 6 together with the available content information to generate a personalized or other content item recommendation for the user. Any suitable content recommendation process may be used, for example based on a weighting, scoring and/or matching process generated based on previous user actions, and matching to available content. The content recommendation process may be at any desired level of simplicity, complexity or sophistication. In a simple example, if it is determined from the user data that a user has previously watched movies starring a particular actor, or watched football matches featuring a particular team, then the CRE 22 may produce a recommendation for the user to watch a movie or other content featuring that actor, or a programme concerning that football team, if such movie, programme or other content is currently available or will soon be available via the available content sources. It will be understood that the content recommendation process can be more sophisticated and, may be for example based on similarities or cross-correlations between different content parameters and user actions and properties based on large amounts of historical data. Any suitable content recommendation process may be used.

Once the CRE 22 has performed the content recommendation process, the content recommendation(s) generated by the CRE 22 are then transmitted to the user device either directly or indirectly. In some embodiments the content recommendation(s) are transmitted to a database, server or other device, for example a third party device. The content recommendation(s) may be further processed and/or may be transmitted onward to then user device either immediately, at a later time or upon request. The content recommendation (s) may be transmitted in any suitable fashion either to the user device, or to the database, server or other device. In the described embodiment, software installed at the user device determines whether or how the content item recommendation are displayed on the user interface.

Subsequently, during the content recommendation session, a second or subsequent recommendation request may be generated in response to subsequent user activity. For example, this may occur when a user accesses the user interface, changes a channel or the user pauses playback of a previously selected content item. In general, the request for recommendation will generally coincide or anticipate a viewer accessing the user interface such that a recommendation can be posted to the user interface and presented to the user together with choice of other content items.

The request may be transmitted directly from the user device to the recommendation module. Alternatively, the request may be transmitted indirectly. For example, the user device may send a request to a separate server to be relayed to the content recommendation module 2. As another alternative, a server hosting the content that is being recommended may request the content recommendation for the user, and then the server may provide the recommendation to the user together with the choice of content items.

The request may be in the form of an indication that the user or user device has taken or requested a particular action, and the content recommendation module 2 may interpret this as a request to provide a content recommendation.

In response to the subsequent recommendation request the CRE 22 performs a further content recommendation process as outlined above to generate a personalized or other content item recommendation for the user. Again, once the CRE 22 has performed the content recommendation process, the content recommendation(s) generated by the CRE 22 are then transmitted to the user device. The user device determines whether or how the content item recommendations are displayed on the user interface. For example the content item recommendations may be displayed on a new EPG screen corresponding to a selection made by the user, with the recommendation request having been generated by the selection made by the user.

As with the content recommendation made in response to the initiation of the user session, there may be significant constraints on how quickly the subsequent content recommendation should be provided. For example, there may be requirement that the content recommendation is provided within 200 ms or 300 ms, or within any other time period that would enable the content recommendation to be displayed simultaneously with, overlaid on or forming part of the new EPG screen when the new EPG screen is first displayed. In some embodiments the user device may be configured not to display the content recommendation if it is not received within a threshold time, for example within 30 s, 10 s, 5 s or 1 s by way of example, and for example to proceed with display of the EPG screen without the content recommendation. Any other suitable display output may be used as well as or instead of an EPG screen in alternative embodiments, for example a window or a selected portion of a screen or window.

It can be understood that the time constraints on providing content recommendations can be significant, given that personalized content recommendations may need to be generated on the fly, particularly as it may be necessary to provide personalized content recommendations for tens of thousands, hundreds of thousands, or even millions of users substantially simultaneously in the case of systems with large numbers of users and during busy periods such as peak viewing periods.

It will be understood that the CRE 22 may maintain content recommendation sessions for a plurality of the users and may maintain in the RAM 7 user data for said plurality of the users substantially simultaneously. For example, user data may be maintained in the RAM 7 for thousands, hundreds of thousands or even millions of users substantially simultaneously, depending on the RAM 7 storage capacity available and the number of subscribers or other users associated with the system.

In the described embodiment, a part, generally a large part, of the user data comprises user history or user action data, e.g., a learn action stored the learn action table 38, that represent user actions over a significant period of time. The CRE 22 can use such user data in real time during a content recommendation process to determine content recommendations.

In various embodiments, there is a limit to how long user data, e.g., learn actions in the learn action table 38, is kept or used. For example in the embodiment of FIG. 1 after a threshold period, for example six months after being collected, items of user data are deleted. Thus, in some embodiments the user data for a particular user may include only relatively recent user action data, although the amounts of data may still be substantial.

Further, it is a feature of the embodiment of FIG. 1 and at least some other embodiments that during a content recommendation session for a particular user, the user data for that user may change or be added to. Thus content recommendations may need to be based on user data which is itself changing during the content recommendation session, which provides further technical considerations and challenges. For example during a content recommendation session, a user may carry out a number of user actions. These may include, for example, switching channel or selecting new content items, watching a content item, pausing a content item, logging in and out of the service, recording of a content item on a PVR or other recording device, or even selecting a piece of content based on a content recommendation provided earlier in the content recommendation session. User actions are logged by the content recommendation module 2 during the session. Some of these user actions are recorded as learn actions to be stored in the learn action table 38 during the session. The user learning module 24 includes a set of rules for determining which user actions are learn actions.

A learn action may be based on an indication that a user has watched a content item for a specified period of time. The information may be used as an indication of user preferences and potentially to provide more accurate recommendations in the future. As discussed, a minimum event time filter may be implemented to ensure that short period events are not sent to the recommendation engine 22. In this case, a learn action is only generated if an event exceeds the minimum event time filter. In addition, there may be a rule that only one learn action for each content item should be generated. For example, a viewer may watch a programme and switch channels during an advert break and then return to the original programme. In such an event, only one learn action for the content recommendation engine 22 may be generated according to some embodiments.

As mentioned, the CRE 22 has an API that provides a set of rules for search and recommendation requests to be communicated between the user device 40 and the CRE.

When engaging the content recommendation module 2 (specifically the CRE 22), a user, e.g., user 205, may be presented with content for viewing based on a search inputted to the CRE 22. For example, the user may enter the search for "game of thrones" and be presented with the television show titled "Game of Thrones" along with other content for viewing. However, prior to entering the entire search string, a user may enter portions of the search string, e.g., "ga", "game", and "game of". These may return different content for viewing. Additionally, a user may introduce spelling mistakes when searching for content, may erase characters of a search string after viewing available content, or make other changes to a search string. Understanding how many individual searches were inputted by the user and the intended search desired by the user can be valuable information to a content distributor. The content distributor may look to add content if the intended content is not available in their content library. Additionally, the search algorithm may be modified if too many searches are required in order to return the intended search.

A method of processing the inputted searches to obtain at least some of this information is described. The method includes determining a time between consecutive searches of a plurality of searches; grouping one or more of the plurality of searches into a search session based on the determined time(s); grouping searches in the search session into a sub-session; and determining an intended search of the sub-session.

Figure 5:
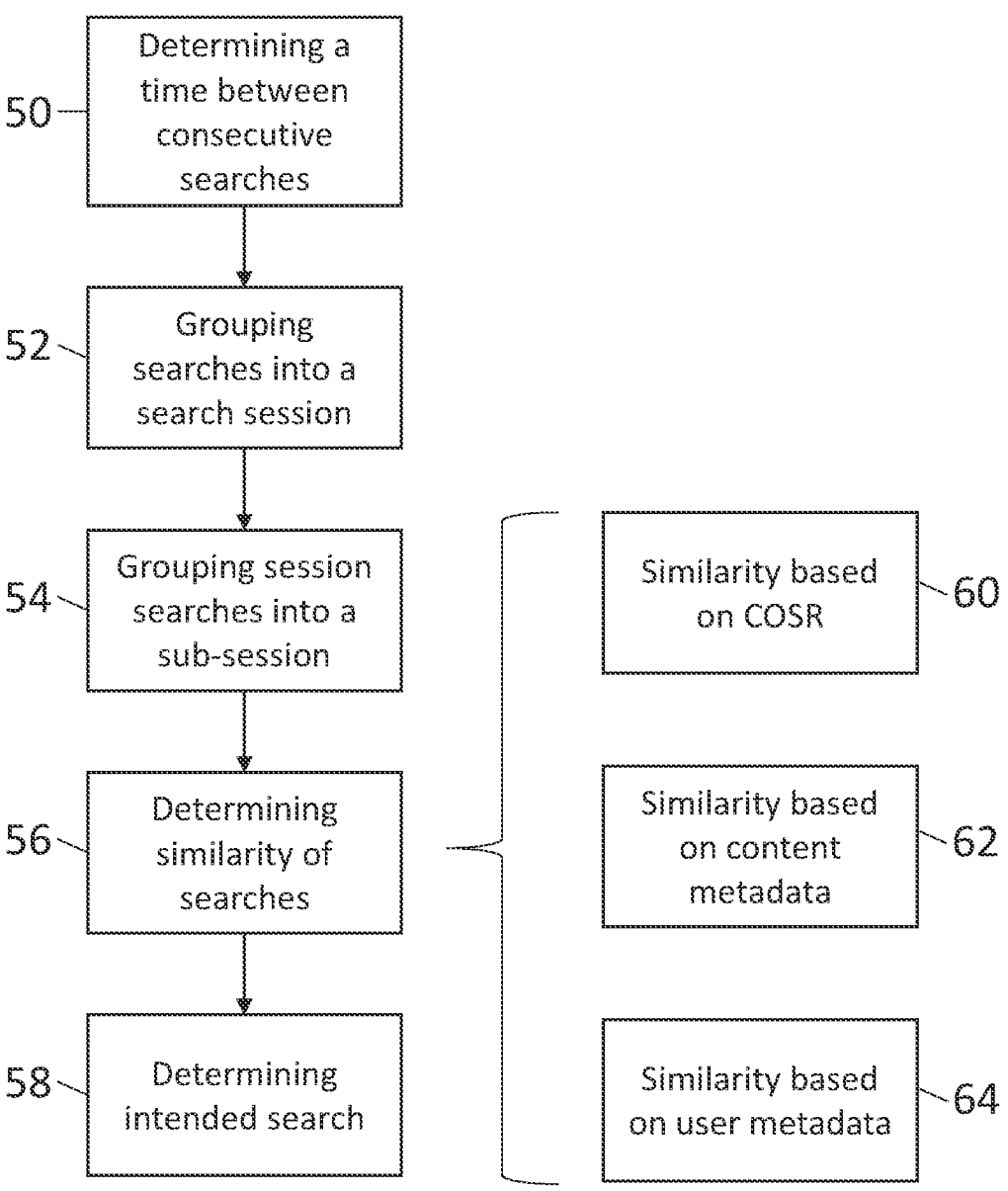
FIG. 5 is a flow chart of a method of processing searches.

A flowchart of the method steps is illustrated in FIG. 5. The method comprises determining 50 a time between consecutive search of a number of searches inputted to the CRE 22. For example, a first search consisting of the characters "ga" may be followed by a second search consisting of the characters "game" within 3 seconds. The searches are then grouped 52 into a search session based on the determined time being within a threshold. For example, the threshold may be 60 seconds such that consecutive searches inputted within 60 seconds of each will be in the same session. Searches in each session are then grouped 54 into a sub-sessions.

In this embodiment, searches in the same sessions are compared to each to determine a similarity score between searches. The similar score may comprise comparing the text strings of each search to determine an associated similarity. Alternatively or additionally, the meaning of each search may be compared and similar meanings may assigned higher similarity scores. Searches with similarity scores being higher than a pre-set threshold are grouped together in the same sub-session. For example, "ga", "game", "game of", and "game of thrones" may be all be grouped together based on having high similarity scores between them.

The method further comprises determining 56 similarities of the searches to a parameter. Determining 56 similarities may comprise determining a similarity score of the search and a parameter. Multiple similarity scores may be determined for each search. As illustrated in FIG. 5, a number of parameter are contemplated. These include a learn action, specifically a Clicked-on Search Result (COSR) 60; content metadata 62; and user metadata 64. The COSR 60 is the content which the user selected after inputting the search and receiving the content recommendation. The COSR indicates that a particular content item was selected for viewing and/or additional information.

The method further comprises determining 58 an intended search, i.e., an intended content item, for each search. The intended search may be based on the determined similarity. The intended search corresponds to the content having the highest determined similarity score. As such, a single intended search is determined for each search. As will be described these searches may be stored in a repository of mapped searches.

To determine the similarity in this instance, a similarity score is determined between the search and the COSR which was selected without a pre-set time window, e.g., 360$s$. If the score is above a pre-determined cut-off value, or if the user search is a substring of the content/channel selected, then the content may be determined 58 to be the intended search.

The content metadata 62 is metadata associated with content such as content title; time; duration; content type; program categorization; genre; release date; episode number; series number; actor; audience; award; language; category; character; character type; concept source; director; format; franchise; host; milieu; mood; producer; person; singer; subcategory; scenario; setting; sports competition; studio; style; subject; team; theme; time period; and writer. In this instance, a similarity score is calculated between the metadata and the search. If the score is above a pre-set threshold, then the content associated with the respective metadata may be determined 58 to be intended search. As will be appreciated, many metadata fields may be present for each content item and as such determining the intended search in this manner may be computationally expensive. This will be further discussed below.

The user metadata 64 comprises metadata associated with a user or a user profile associated with a user. The user or user profile may be associated with the inputted searches. Metadata associated with the user or user profile may comprise age; age range; viewing preferences including genre, language preference, actors and directors; and term of membership to content distribution system associated with the user or user profile.

Searches may be grouped in the same sub-session based on an intended search. In this instance the order of the steps may be altered such that determining 58 the intended search has occurred prior to grouping the searches into the same sub-session.

The output of the method may be determined intended search; however, other information may be beneficial. For example, the time between searches in each session or sub-session which may indicate a user took little or lots of time to find the content of interest. This may indicate that changes to the search algorithm are required, i.e., using a fuzzy search when the number of characters in a search are below a threshold and using an exact search when the number of characters in the search are above a threshold. This information may improve, not only user experience with the system, but also reduce processing times associated with search and content selection. This may accordingly improve system, server and/or computer processor performance as fewer computations are required to complete a single search session or sub-session. This may improve overall system performance thereby allowing more users to be added to the system without performance issues.

As mentioned, many metadata fields may be present for each content item and as such determining the intended search using content metadata may be computationally expensive. This may be true for determining the similarity score associated with any of the described parameters. For example, if a catalogue includes 50,000 items of content and there are 1.5 million searches to be processed, there would be 75 billion computations to make to compare each search to each content item. This can increase processing time and resource usage, result in lag in generating content recommendation, and negatively impact system operation and efficiency.

Figure 6:
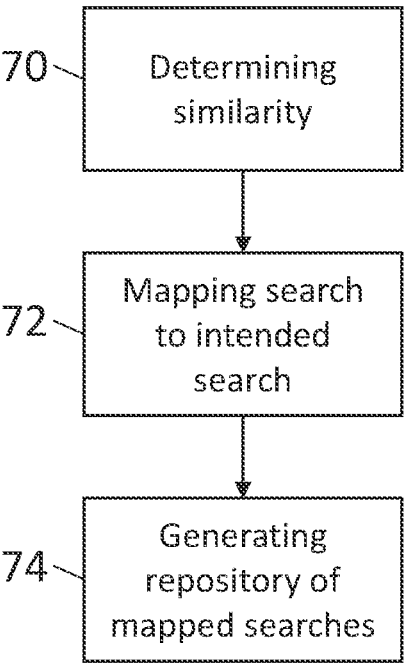
FIG. 6 is a flow chart of another method of processing searches.

Beneficially, a search repository may be generated according to the flowchart illustrated in FIG. 6. The search repository may act as a lookup table for new searches which correspond with searches previously mapped to an intended search term based on a determined similarity score. This may significantly time and resource requirements for processing searches. The search repository may be regenerated upon a batch upload of new content.

Turning now to FIG. 6, the method of processing searches comprises determining 70 a similarity (e.g., similarity score) of a search. This may involve determining the similarity for each of the searches inputted into the CRE. The similarity may be determined in the previously-described manner, i.e., based on a comparison with the COSR, content metadata or user metadata. The determining 70 may result in a similarity score for each comparison made. Based on the similarity score, the search is then mapped 72 to an intended search. For example, the search "game of thr" may have a similarity score with the content item "Game of Thrones" based on content metadata where the metadata is the title of the content. The similarity score may be 0.9872 within a possible range of 0 to 1. In another example, the search "Batman" may have a similarity score of 0.950 with "Batman the Animated Series" based on a learn action, e.g., a COSR of "Batman the Animated Series".

Each mapping may have an associated confidence level. Confidence levels may correspond to particular ranges of similarity scores. For examples, there may be 4 confidence levels: Low, Mid-Low, Mid-High, and High. High may correspond to a similarity range of 1-0.980. Mid-High may correspond to a range of 0.980-0.950. Mid-Low may correspond to a range of 0.950-0.920. Low may correspond to a range of 0.920-0.900. Confidence scores may be used as labels for the mapping to quickly understand the confidence associated with any particular mapping.

The method further comprises generating 74 a search repository of the mapped searches. The repository may take the form of a lookup table of searches mapped to intended searches according along with the associated similarity score and confidence level. An exemplary search repository is presented below in Table 1.

| Search | Intended Search | Category | Mechanism | Score | Confidence |
|--------|-----------------|----------|-----------|-------|------------|
| game | Game Of Thrones | Title | Content Metadata | 0.9012 | Low |
| game of thr | Game Of Thrones | Title | Content Metadata | 0.9746 | Mid-High |
| game of thro | Game Of Thrones | Title | Content Metadata | 0.9872 | High |
| game of throne | Game Of Thrones | Title | Content Metadata | 0.9992 | High |
| game of thrones | Game Of Thrones | Title | Content Metadata | 1.0 | High |

As shown in Table 1, the confidence score associated with the search "game" to "Game of Thrones" is low using a parameter of content metadata. However, if the parameter is instead COSR, the similarity score may be 1 assuming the user immediately selected "Game of Thrones" for viewing. Further, the similarity score of the search "toy" to "Game of Thrones" may be below the Low category, i.e., less than 0.900. Such a mapping may not be included in the repository.

The skilled person will appreciate that the noted confidence levels and ranges are only exemplary, and could be varied as desired.

Searches and their associated intended search may be used to accelerate search processing. If a new search is inputted and it corresponds to a previously mapped search, the intended search need not be determined, rather it can simply be looked up in the repository. If a new search is inputted which is not in the table, the similarity score may be calculated based on any of the described parameters. If the confidence level of the score is below the Low threshold (i.e., <0.900), then the mapping is not included in the repository. If however, the confidence level with a particular content item is above the threshold, it is added to the repository.

The repository may include content which is not available to the users through the content distributor, but is nonetheless known. This may inform the content distributor that the content is desirable to its users. The content distributor can thus elect to obtain rights to the content, or produce similar or related content.

Each individual feature described herein is disclosed in isolation and any combination of two or more features is disclosed to the extent that such features or combinations are capable of being carried out based on the present specification as a whole in the light of the common general knowledge of one of skill in the art, irrespective of whether such features or combination of features solve any problems disclosed herein, and without limitation to the scope of the claims. Aspects of the disclosure may consist of any such individual feature or combination of features. In view of the foregoing description it will be evident to one of skill in the art that various modifications may be made within the scope of the disclosure.

It should be understood that the examples provided are merely exemplary of the present disclosure, and that various modifications may be made thereto.

What is claimed is:

1. A method of processing searches input into a content recommendation engine (CRE), the CRE adapted to receive searches and provide one or more content recommendations based on the received searches for a user of a content distribution system having a plurality of users, the method comprising:

determining a time between consecutive searches of a plurality of searches;

grouping one or more of the plurality of searches into a search session based on the determined time;

then grouping searches in the search session into a sub-session, wherein searches with similarity scores higher than a pre-set threshold are grouped together in the same sub-session;

determining a similarity of searches in the sub-session, wherein determining the similarly of searches comprises comparing searches in the sub-session to at least one parameter, wherein the parameter comprises learn actions, and wherein the learn actions comprise clicked-on search results (COSR), each COSR indicating that a particular content item was selected for viewing;

categorizing each search in the sub-session based on the determined similarity; and determining an intended search of the sub-session based on the determined similarity.

2. The method of claim 1, wherein the parameter comprises at least one of:

content metadata; and user metadata.

3. The method of claim 2, wherein at least one of:

content metadata comprises metadata associated with content of the content distribution system; and user metadata comprises metadata associated with a user or associated user profile.

4. The method of claim 1, wherein determining the intended search comprises determining the intended search term based on the similarity exceeding a threshold, and/or selecting the search with the highest similarity.

5. The method of claim 1, further comprising:

determining an intended search based on additional input.

6. The method of claim 1, further comprising:

determining a number of sub-sessions.

7. The method of claim 1, wherein grouping one or more of the plurality of searches into a search session comprises grouping the consecutive searches into the search session if the time is below a threshold.

8. The method of claim 1, further comprising at least one:

determining a search session duration; and determining a sub-session duration.

9. The method of claim 1, further comprising:

determining a similarity of the searches in the search session.

10. The method of claim 9, wherein grouping searches into a sub-session comprises grouping searches into the sub-session based on the similarly.

11. The method of claim 1, further comprising:

categorising the plurality of searches; and filtering the plurality of searches based on the categories.

12. The method of claim 1, wherein the COSR comprises content which a user selected after inputting the respective search and receiving a content recommendation.

13. The method of claim 1, wherein categorizing comprises categorizing each search in the sub-session into one of a plurality of predefined confidence levels based on the determined similarity.

14. The method of claim 1, further comprising:

generating a search repository for each search within the sub-session, storing an association between each search and the determined intended search of the sub-session in a look-up table; and in response to receiving a new search subsequent to generating the search repository:

looking up the new search in the search repository to determine if the new search corresponds to a search in the look-up table; and when the new search corresponds to a search in the look-up table, retrieving the corresponding intended search from the repository, thereby bypassing the step of determining a similarity for the new search.

15. A method of processing searches input into a content recommendation engine (CRE), the CRE adapted to receive searches and provide one or more content recommendations based on the received searches for a user of a content distribution system having a plurality of users, the method comprising:

determining a similarity of each search of a plurality of searches, wherein searches in the search session with a similarity scores higher than a pre-set threshold are grouped together in a same sub-session;

determining a similarity of searches in the sub-session, wherein determining the similarly of searches comprises comparing searches in the sub-session to at least one parameter, wherein the parameter comprises learn actions, and wherein the learn actions comprise clicked-on search results (COSR), each COSR indicating that a particular content item was selected for viewing;

categorizing each search in the sub-session based on the determined similarity; and mapping each search of the plurality of searches to an intended search based on the determined similarity.

16. The method of claim 15, further comprising:

generating a search repository of the mapped searches.

17. The method of claim 16, wherein generating the search repository comprises generating the search repository of mapped searches exceeding a threshold similarity.

18. The method of claim 15, further comprising:

determining an intended search of a new search based on the search repository.

19. A non-transitory computer-readable medium having computer program code stored thereon, the program code executable by a processor to perform the method of any preceding claim.

\* \* \* \* \*